United States Patent
Foster (10) Patent No.: US 9,957,972 B2
(45) Date of Patent: May 1, 2018

(54) AIRFOIL WITH AN INTEGRALLY STIFFENED COMPOSITE COVER

(71) Applicant: United Technologies Corporation, Hartford, CT (US)

(72) Inventor: Larry Foster, South Glastonbury, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 255 days.

(21) Appl. No.: 14/913,709

(22) PCT Filed: Aug. 12, 2014

(86) PCT No.: PCT/US2014/050614
§ 371 (c)(1),
(2) Date: Feb. 23, 2016

(87) PCT Pub. No.: WO2015/034630
PCT Pub. Date: Mar. 12, 2015

(65) Prior Publication Data
US 2016/0201480 A1 Jul. 14, 2016

Related U.S. Application Data

(60) Provisional application No. 61/875,333, filed on Sep. 9, 2013.

(51) Int. Cl.
*F01D 5/14* (2006.01)
*F04D 29/02* (2006.01)
(Continued)

(52) U.S. Cl.
CPC ....... *F04D 29/023* (2013.01); *B29D 99/0014* (2013.01); *B29D 99/0028* (2013.01);
(Continued)

(58) Field of Classification Search
CPC ..... F01D 5/00; F01D 5/12; F01D 5/14; F01D 5/147; F01D 5/282; F05D 2300/522;
(Continued)

(56) References Cited

U.S. PATENT DOCUMENTS

| 4,643,647 A | 2/1987 | Perry |
| 5,129,787 A | 7/1992 | Violette et al. |

(Continued)

FOREIGN PATENT DOCUMENTS

| EP | 2362066 | 8/2011 |
| EP | 2458153 | 5/2012 |

OTHER PUBLICATIONS

International Search Report and Written Opinion for PCT Application No. PCT/US2014/050614 completed Nov. 19, 2014.
(Continued)

*Primary Examiner* — Richard Edgar
(74) *Attorney, Agent, or Firm* — Carlson, Gaskey & Olds, P.C.

(57) ABSTRACT

An airfoil according to an exemplary aspect of the present disclosure includes, among other things, a main body extending between a leading edge and a trailing edge separated in a chordwise direction and extending between a tip and a root in a spanwise direction. The main body defines a suction side and a pressure side separated in a thickness direction and a plurality of channels extending inwardly from at least one of said suction and pressure sides. A composite cover is attached to the main body. The composite cover includes a plurality of stiffeners each received within one of the channels. A cover skin is adjacent the stiffeners, and an over-wrap surrounds the stiffeners and the cover skin.

20 Claims, 6 Drawing Sheets

(51) Int. Cl.
    *F01D 15/12* (2006.01)
    *F01D 5/28* (2006.01)
    *F04D 29/32* (2006.01)
    *B29D 99/00* (2010.01)
    *B29L 31/08* (2006.01)

(52) U.S. Cl.
    CPC ............ *F01D 5/147* (2013.01); *F01D 5/282* (2013.01); *F01D 15/12* (2013.01); *F04D 29/324* (2013.01); *B29L 2031/08* (2013.01); *F01D 5/288* (2013.01); *F05D 2220/32* (2013.01); *F05D 2220/36* (2013.01); *F05D 2230/23* (2013.01); *F05D 2230/60* (2013.01); *F05D 2240/303* (2013.01); *F05D 2250/11* (2013.01); *F05D 2250/23* (2013.01); *F05D 2300/603* (2013.01); *F05D 2300/6012* (2013.01); *F05D 2300/6034* (2013.01); *Y02T 50/672* (2013.01); *Y02T 50/673* (2013.01)

(58) Field of Classification Search
    CPC ....... F05D 2300/6012; F05D 2300/603; F05D 2300/6034; F05D 2300/612
    See application file for complete search history.

(56) References Cited

U.S. PATENT DOCUMENTS

| | | | |
|---|---|---|---|
| 5,725,355 A | * | 3/1998 | Crall ...................... F01D 5/147 416/229 A |
| 5,791,879 A | | 8/1998 | Fitzgerald et al. |
| 5,839,882 A | | 11/1998 | Finn et al. |
| 6,039,542 A | | 3/2000 | Schilling et al. |
| 6,872,340 B2 | | 3/2005 | Cundiff et al. |
| 7,828,526 B2 | | 11/2010 | Cairo et al. |
| 8,241,003 B2 | | 8/2012 | Roberge |
| 2008/0181766 A1 | | 7/2008 | Campbell et al. |
| 2013/0039774 A1 | | 2/2013 | Viens et al. |
| 2013/0064676 A1 | | 3/2013 | Salisbury et al. |
| 2013/0167555 A1 | | 7/2013 | Schwarz et al. |

OTHER PUBLICATIONS

Extended European Search Report for European Patent Application No. 14842050.8 completed May 9, 2017.
International Preliminary Report on Patentability for PCT Application No. PCT/US2014/050614 completed Mar. 15, 2016.

\* cited by examiner

AIRFOIL WITH AN INTEGRALLY STIFFENED COMPOSITE COVER

CROSS-REFERENCE TO RELATED APPLICATION

This application claims priority to U.S. Provisional Application No. 61/875,333, filed Sep. 9, 2013.

BACKGROUND

This disclosure relates to a gas turbine engine, and more particularly to a composite airfoil.

An airfoil, such as a fan blade for a turbine engine, typically includes a main body formed from a strong and durable metal alloy. The metal alloy provides a desired degree of strength and durability under the operating conditions of the engine and resists damage from ingested foreign objects. To reduce weight and cost, the fan blade may include a composite cover. The composite cover may include one or more laminated layers. Generally, the composite cover is adhesively bonded to a main body of the airfoil. However, the main body has the tendency to yield at a different rate than the composite cover. Laminated structures are susceptible to delamination failure which can result in the liberation of plies and dramatic loss of structural capability.

Therefore, an adhesively bonded composite cover presents certain challenges. In particular, the composite cover has to maintain sufficient structure and integrity after a first strike event. Both the bond and the cover must be durable enough to meet the Federal Aviation Administration (FAA) bird strike requirements. Accordingly, a durable, lightweight, and easily bonded cover design is desirable.

SUMMARY

An airfoil, according to an exemplary embodiment of this disclosure, among other possible things includes a main body that extends between a leading edge and a trailing edge in a chordwise direction and extending between a tip and a root in a spanwise direction. The main body defines a suction side and a pressure side that are separated in a thickness direction. A plurality of channels extends inwardly from at least one of said suction and pressure sides. A composite cover is attached to the main body and includes a plurality of stiffeners that are each received within one of the channels. A cover skin is adjacent to the stiffeners. An over-wrap surrounds the stiffeners and the cover skin.

In a further embodiment of the above, each of the stiffeners is formed from a stiffener wrap surrounding a stiffener body.

In a further embodiment of any of the above, the stiffener body is removable from the stiffener wrap to define a stiffener shell.

In a further embodiment of any of the above, the stiffener wrap includes a plurality of braided yarns.

In a further embodiment of any of the above, the stiffener is made of a first material and the main body is made of a second material different from the first material in density.

In a further embodiment of any of the above, the cover skin includes a braided fabric.

In a further embodiment of any of the above, the braided fabric includes a first fiber material that extends in a braid axial direction and a second fiber material different from the first fiber material and extends in a braid bias direction.

In a further embodiment of any of the above, the composite cover is bonded to the channels.

In a further embodiment of any of the above, the composite cover defines a continuous surface with at least one of the suction and pressure sides.

In a further embodiment of any of the above, the composite cover includes a plurality of spacers each received between the over-wrap, one of the stiffeners and the cover skin.

In a further embodiment of any of the above, each of the spacers includes at least one of a plurality of braided yarns and a braided fabric.

In a further embodiment of any of the above, each of the spacers includes a foam material encapsulated by a spacer over-wrap.

A gas turbine engine, according to an exemplary embodiment of this disclosure, among other possible things includes a turbine section and a fan section in communication the turbine section. The fan section includes a plurality of fan blades. Each fan blade includes an airfoil and a root. The airfoil includes a main body and a composite cover is attached to the main body. The main body defines a plurality of channels that extend inwardly from at least one of a suction side and a pressure side defined by the main body. The composite cover includes a cover skin, a plurality of stiffeners each received within one of the channels and an over-wrap surrounding the stiffeners and the cover skin.

In a further embodiment of the above, the fan section is driven by a geared architecture that is mechanically coupled to said turbine section.

In a further embodiment of any of the above, each of the stiffeners is formed from a stiffener wrap surrounding a stiffener body.

In a further embodiment of any of the above, the stiffener wrap includes a plurality of braided yarns.

In a further embodiment of any of the above, the cover skin includes at least one ply of a braided fabric.

A method of forming a composite cover for an airfoil, according to an exemplary embodiment of this disclosure, among other possible things includes forming a plurality of channels within at least one of a pressure side and a suction side of a main body, fabricating a plurality of stiffeners each by braiding a plurality of fiber yarns over a stiffener body, fabricating a cover skin from at least one ply of a braided fabric, arranging each of the stiffeners adjacent to the cover skin, surrounding the stiffeners and the cover skin with an over-wrap, curing the stiffeners, the cover skin and the over-wrap within a resin to define a composite cover, and bonding the composite cover to the channels.

In a further embodiment of the above, the step of curing the fiber yarns within a resin to define a stiffener shell prior to the step of encapsulating the stiffeners and the cover skin with the over-wrap.

In a further embodiment of any of the above, the composite cover defines a continuous surface with at least one of the suction and pressure sides.

These and other features disclosed herein can be best understood from the following specification and drawings, the following of which is a brief description.

DETAILED DESCRIPTION

Figure 1:
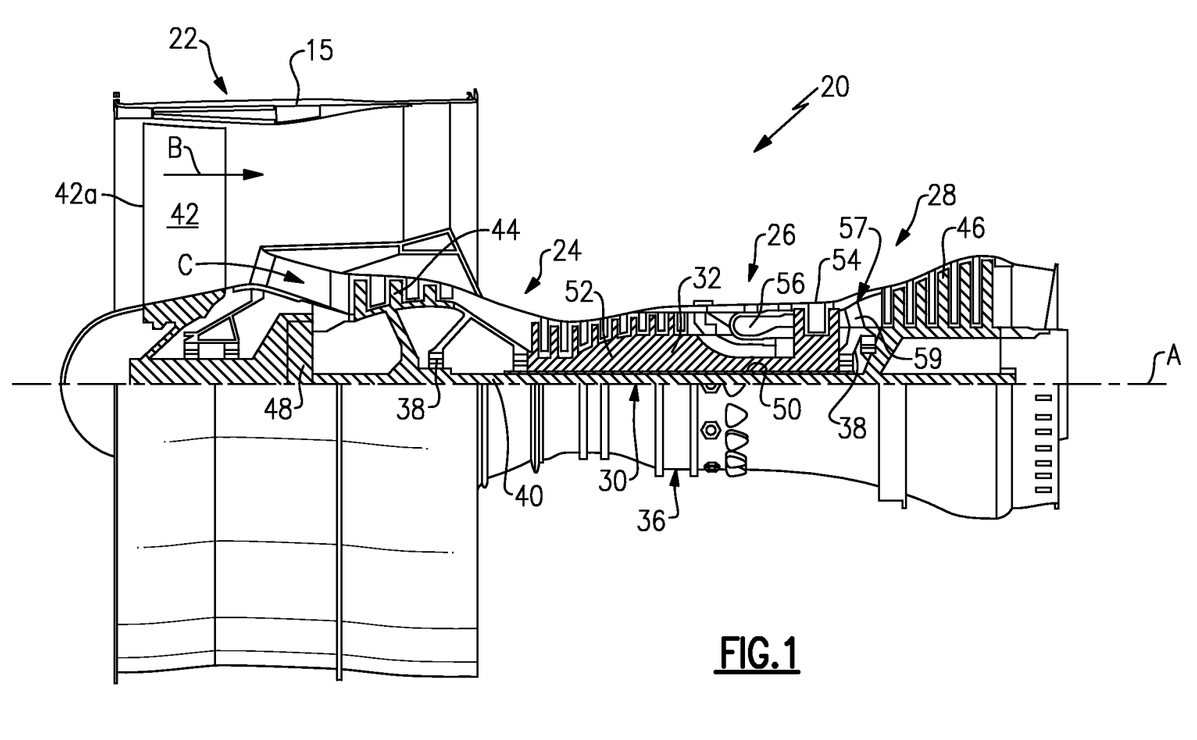
FIG. 1 illustrates an example turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 50 may be varied. For example, gear system 50 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
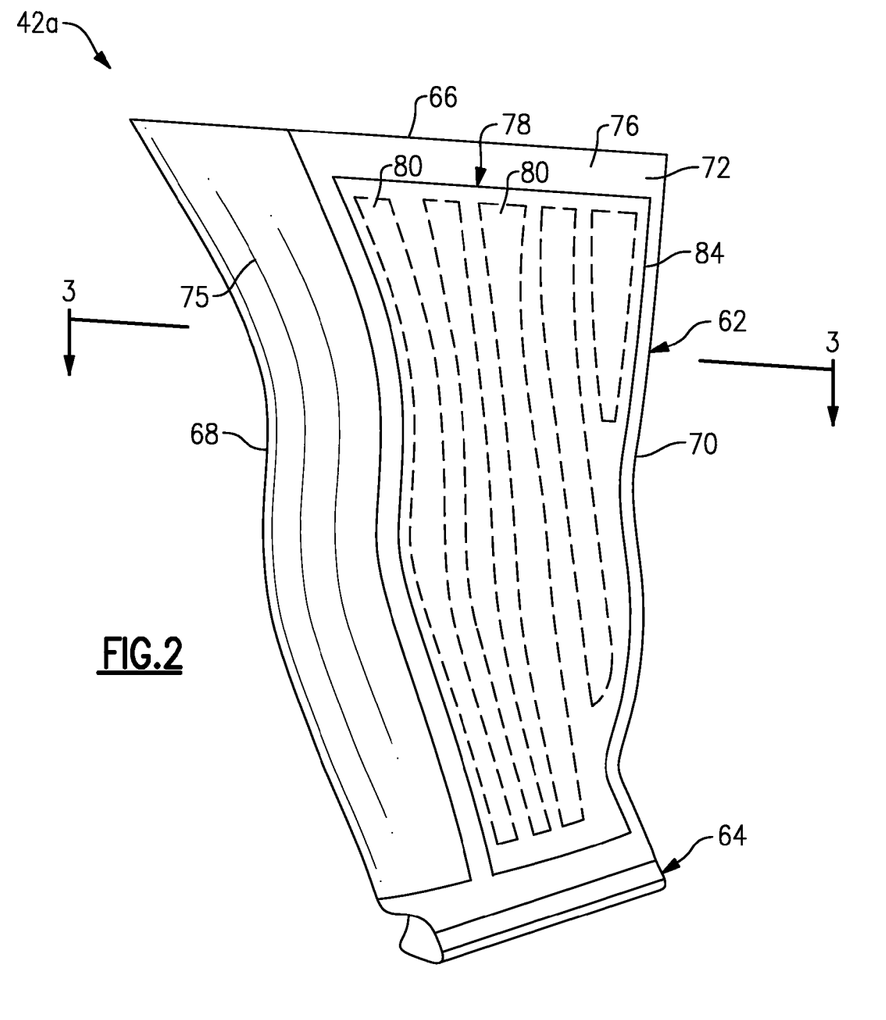
FIG. 2 illustrates a perspective view of a composite airfoil.

FIG. 2 illustrates a composite airfoil for a gas turbine engine 20. In this example, the composite airfoil is a fan blade 42a for the fan 42. However, it is to be understood that other types of airfoils and other parts of the gas turbine engine 20 may benefit from the examples disclosed herein which are not limited to the design shown. In another example, the airfoil may be a structural guide vane, an airfoil that also acts as a frame to carry structural loads. In yet another example, the composite airfoil may be an exit guide vane.

The fan blade 42a includes an airfoil section 62 and a root section 64. The root section 64 is a shape that is configured to mount the fan blade 42a in the turbine engine 10, such as a dovetail shape. Generally, the airfoil section 62 provides an aerodynamic surface. Generally, one side of the airfoil section 62 is a suction side 72 and the other side is a pressure side 74 (shown in FIG. 3). The airfoil section 62 extends longitudinally between the root section 64 and a tip 66. The tip 66 is a terminal end of the fan blade 42a. The fan blade 42a includes a main body 76 extending in a chordwise direction between a leading edge 68 and a trailing edge 70. The main body 76 may be made out of metallic materials such as titanium or aluminum. However, other materials for the main body 76 are contemplated, including alloys and composites. The fan blade 42a may include a sheath 75 extending along a periphery of the leading edge 68 for providing additional protection to the main body 76.

The fan blade 42a includes a composite cover 78 disposed on a surface of the airfoil section 62. In one example, the composite cover 78 is arranged to provide a continuous surface with the suction side 72 of the fan blade 42a. Generally, the composite cover 78 is located on the suction side 72 to avoid direct impact to the composite cover 78. However, other arrangements of the composite cover 78 are contemplated. In another example, the composite cover 78 is disposed on the pressure side 74 of the fan blade 42a. In yet another example, the fan blade 42a includes a composite cover 78 disposed on both of the suction and pressure sides 72, 74. There may be a single composite cover on at least one of the suction and pressure sides 72, 74. However, the fan blade 42a may include more than one composite cover on either of the suction and pressure sides 72, 74.

Figure 3:
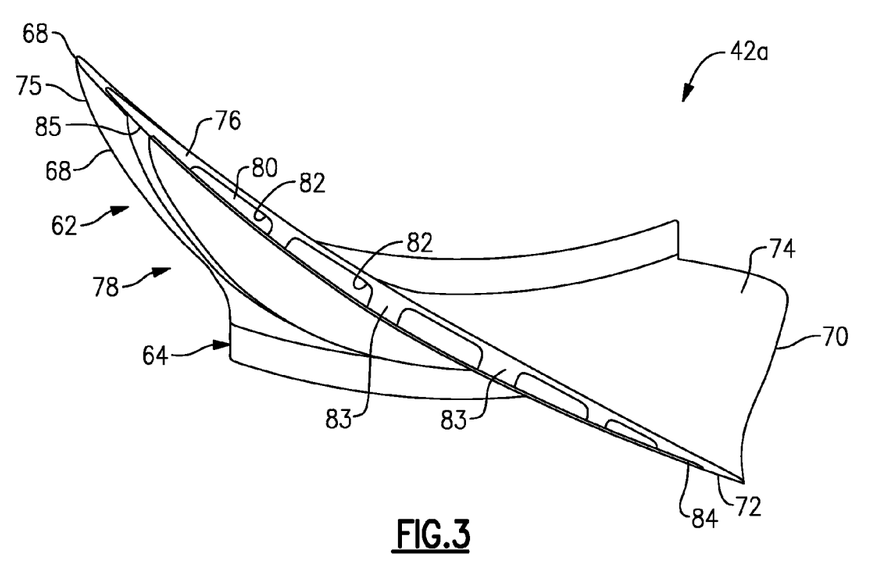
FIG. 3 illustrates a chordwise cross section view of the composite airfoil of FIG. 2.

Referring to FIG. 3, the composite cover 78 includes a plurality of stiffeners 80. Generally, the stiffeners 80 include a lightweight material relative to a material of the main body 76. The main body 76 defines a plurality of channels 82 each extending inwardly from an outer surface 85 of the main body 76. Each of the stiffeners 80 is configured to be received within one of the channels 82. A plurality of ribs 83 separates each of the channels 82 from each other. As shown, the channels 82 are spaced apart from each other in the chord wise direction and are substantially parallel to each other. Generally, the channels 82 extend in a spanwise direction between the root section 64 and the tip 66 (shown in FIG. 2). However, other arrangements and dimensioning of the channels 82 are contemplated, including variations in quantity, shape and size. For example, the channels 82 may be oriented in the chordwise direction extending between the leading and trailing edge 68, 70 of the airfoil section 62.

Figure 4:
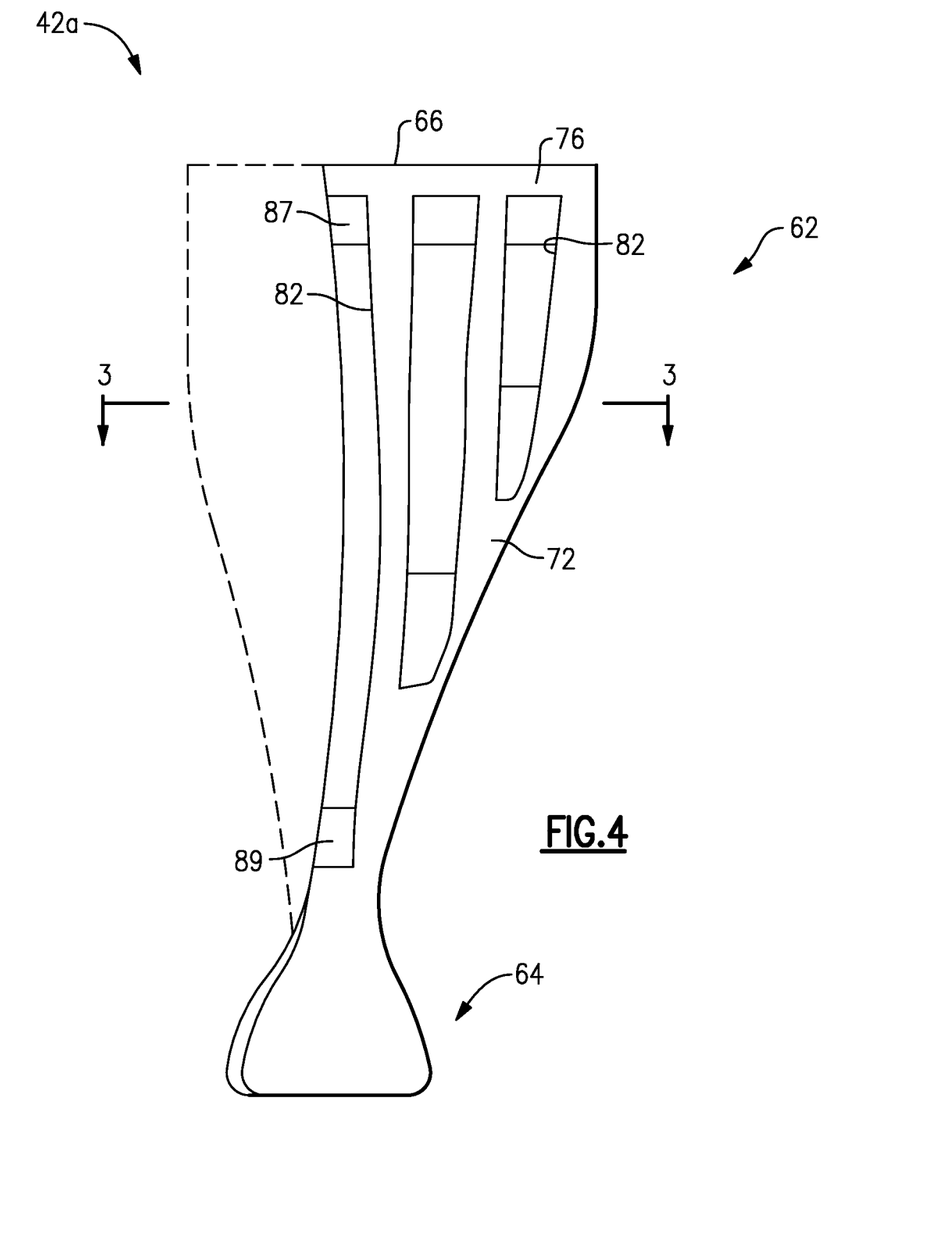
FIG. 4 illustrates a longitudinal cross section view of the composite airfoil of FIG. 2.

Referring to FIG. 4 with continued reference to FIG. 3, each of the channels 82 may include a first tapered portion 87 near the tip 66 and a second tapered portion 89 near the root section 64. In another example, the ends of the channels 82 may include a generally planar configuration. Generally, the configuration of each of the channels 82 corresponds to the dimensional requirements of the airfoil section 62. The composite cover 78 includes a cover skin 84. The cover skin 84 is dimensioned to extend over the channels 82 and the ribs 83.

Figure 5:
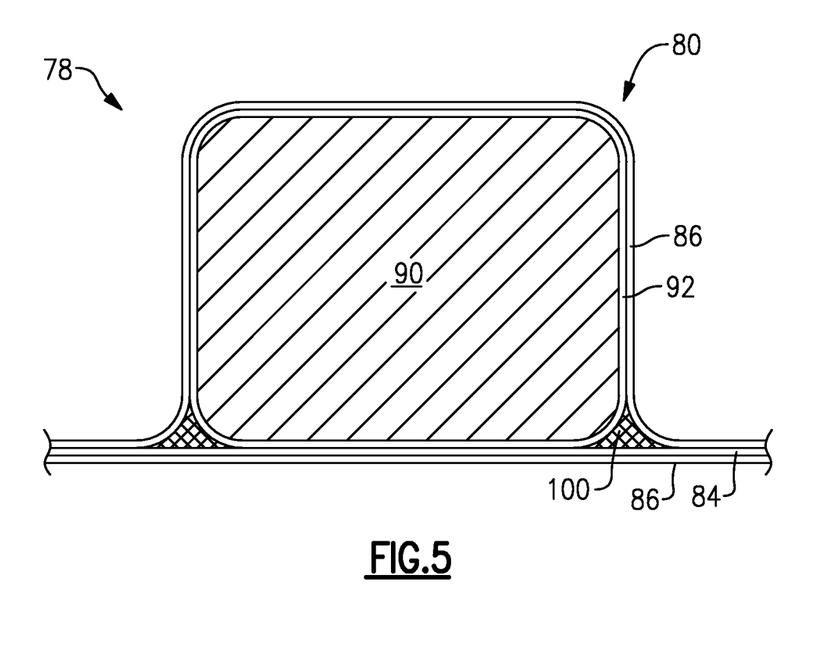
FIG. 5 illustrates a partial cross section view of a composite cover.

FIG. 5 illustrates a portion of the composite cover 78. In one example, each of the stiffeners 80 includes a stiffener body 90 and a stiffener wrap 92 surrounding a substantial portion of the stiffener body 90. In another example, the stiffener wrap 92 surrounds each outer surface of the stiffener body 90.

The stiffener body 90 can be made of a material different from the material of the main body 76. In some examples, the stiffener body 90 is made of a material having a different density than a material of the main body 76, and in one example includes a lower density than the material of the main body 76. The stiffener body 90 can include a foam or other lightweight material such as polyurethane. However, other materials for the stiffener body 90 are contemplated, such as metallic foam and polymethacrylimide (PMI) foam sold under the trade name Rohacell®. In further examples, the stiffener body 90 is formed from one or more plies of fabric or from braided yarns. In further examples, the stiffener body 90 includes a different construction than the main body 76. For example, the stiffener body 90 can be formed as a honeycomb structure and the main body 76 is substantially solid throughout. In another example, the stiffener body 90 is solid throughout and the main body 76 defines a hollow cavity. However, other constructions of the main body 76 and stiffener body 90 are contemplated.

Figure 6:
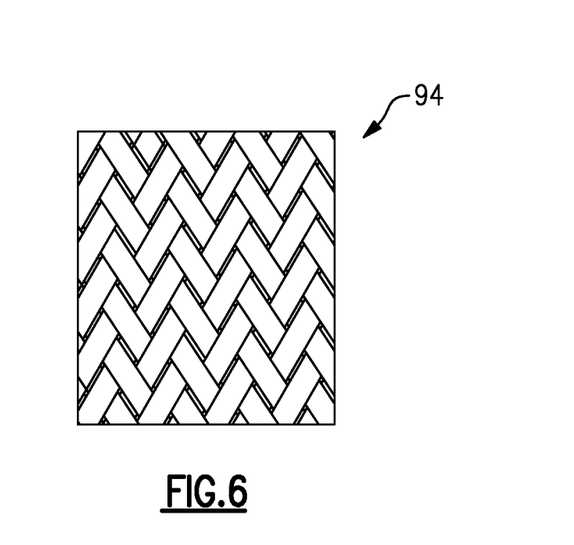
FIG. 6 illustrates a braided yarn for a composite cover.

The stiffener wrap 92 can include a plurality of braided yarns (shown in FIG. 6). In one example, each of the braided yarns includes a plurality of carbon fibers. However, other materials are contemplated, including fiberglass, Kevlar®, a ceramic such as Nextel™, and a polyethylene such as Spectra®. In yet another example, the stiffener wrap 92 includes a plurality of uni-tape plies or a fabric. It should be appreciated that uni-tape plies include a plurality of fibers oriented in the same direction ("uni-directional"), and fabric includes woven or interlaced fibers, each known in the art.

Figure 7A:
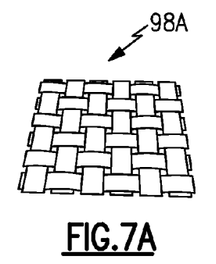
FIG. 7A illustrates a two-dimensional woven fabric for a composite cover.
Figure 7B:
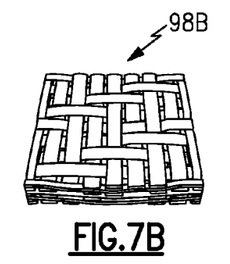
FIG. 7B illustrates a three-dimensional woven fabric for a composite cover.
Figure 7C:
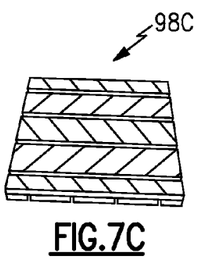
FIG. 7C illustrates a non-crimp fabric for a composite cover.
Figure 7D:
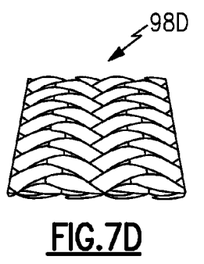
FIG. 7D illustrates a tri-axial braided fabric for a composite cover.

The cover skin 84 is arranged adjacent to each of the stiffeners 80. The cover skin 84 is adjacent to an outer surface of the composite cover 78 when located in an installed position. In one example, the cover skin 84 is constructed from a two-dimensional woven fabric 98a (shown in FIG. 7A). In another example, the cover skin 84 is constructed from a three-dimensional woven fabric 98b (shown in FIG. 7B). In yet another example, the cover skin 84 is constructed from a non-crimp fabric 98c (shown in FIG. 7C). Other configurations for the cover skin 84 may include a plain weave and a satin weave. In still another example, the cover skin 84 may include a plurality of braided yarns. For example, the cover skin 84 may include a plurality of tri-axial braids 98d (shown in FIG. 7D) or biaxial braids (not shown). However, other materials and configurations for the cover skin 84 are contemplated. For example, the cover skin 84 may include different fiber types in the braid axial and braid bias directions to tailor the strength and stiffness of the cover skin 84. For example, high modulus carbon fibers may be used in conjunction with low modulus carbon fibers. In yet another example, fiberglass or Kevlar® fibers may be used in combination with carbon fibers.

Figure 8:
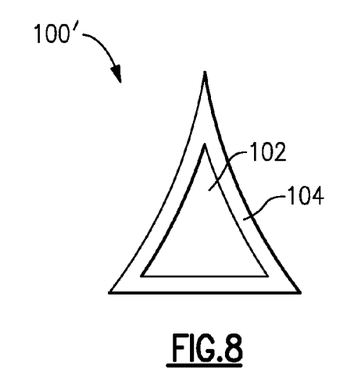
FIG. 8 illustrates an example spacer for a composite cover.

The composite cover 78 may include a plurality of spacers 100 arranged adjacent to the stiffeners 80 and the cover skin 84 to provide a contoured surface. In one example, the spacers 100 are formed from a fabric. In another example, the spacers 100 are formed from a plurality of braided yarns. FIG. 8 illustrates another example spacer 100'. The spacer 100' includes a spacer body 102 and a spacer wrap 104 surrounding the spacer body 102. In yet another example, the spacer body 102 is made of a foam material or foaming adhesive. However, other materials for the spacer body 102 are contemplated. Additionally, other dimensions of the spacers 100 are contemplated. In another example, the stiffeners 80 are dimensioned to provide a contoured surface similar to the spacers 100, thus eliminating the need for a separate component.

Referring back to FIG. 5, the composite cover 78 includes an overwrap 86. Generally, the overwrap 86 surrounds a substantial portion of a perimeter of the stiffeners 80 and the cover skin 84. As shown, the overwrap 86 extends about the entire perimeter of the stiffeners 80 and the cover skin 84. The overwrap 86 may be constructed by any one of the examples previously given for the stiffener wrap 92. However, other configurations and materials for the overwrap 86 are contemplated.

One example of the composite cover 78 is formed as follows. The main body 76 of the fan blade 42a is machined to define the channels 82. However, the channels 82 may be defined by other conventional methods. Each stiffener body 90 is pre-cured or pre-machined to the desired dimension, corresponding to the respective configuration of one of the channels 82. Fiber yarns are braided over the stiffener body 90 to form the stiffeners 80. In another example, the stiffeners 80 may be formed by a removable tool which is substituted for the stiffener body 90. This results in a further weight reduction over conventional airfoils.

The cover skin 84 is constructed from at least one ply of a woven or braided fabric. The stiffeners 80 are then arranged adjacent to the cover skin 84. The spacers 100 are fabricated and then located adjacent to each corner of the stiffeners 80 adjacent to the cover skin 84. It should be appreciated that the stiffeners 80 and the cover skin 84 may be pre-formed or pre-impregnated with resin prior to assembly of the composite cover 78.

The stiffeners 80 and the cover skin 84 are surrounded by the overwrap 86. In one example, the overwrap 86 surrounds each of the exposed surfaces of the stiffeners 80 and the cover skin 84. However, the overwrap 86 may surround less than all of the exposed surfaces of the stiffeners 80. Generally, the overwrap 86 effectively connects the stiffeners 80 and the cover skin 84 together. The stiffeners 80, the cover skin 84 and the overwrap 86 are placed in a mold (not shown). A resin is injected into the mold, and the components are cured to define the composite cover 78. In other examples, at least some of the components of the composite cover 78 are pre-impregnated with a resin material, and the cover 78 is then cured in an oven, autoclave or by other conventional methods. Thereafter, the composite cover 78 is bonded to the main body 76 of the fan blade 42a after locating the stiffeners 80 within the channels 82, known to those skilled in the art as "secondary bonding.

Various bonding materials and methods of applying the bonding materials are contemplated. The bonding materials can include epoxy adhesives, polyurethane adhesives, adhesives curable at room temperate, adhesives curable at elevated temperatures, as well as other conventional adhesives. Various adhesives are also contemplated, including paste adhesives. Film adhesives can be used to maintain a suitable bond line, and can be used either separately or together with paste adhesives. In some examples, the bonding material is applied to the channels 82 and ribs 83 of the main body 76. In other examples, the bonding material is also applied to the overwrap 86 or other surfaces of the composite cover 78.

In other examples, the composite cover 78 and main body 76 are simultaneously cured and bonded to each other, known to those skilled in the art as "co-bonding" or "co-curing." In similar examples, the main body 76 is used as the tool. The pre-impregnated components of the composite cover 78 are preformed to a suitable geometry, the bonding materials are applied to either or both of the main body 76 and the composite cover 78, and then the composite cover 78 and main body 76 are co-cured.

The composite airfoil includes many benefits over a conventional airfoil. One benefit of the composite cover 78 includes a weight reduction relative to a conventional metallic airfoil. Some other benefits as compared to a conventional airfoil or cover include structural tuning (e.g., strength and stiffness), absorption of energy from impacts by foreign objects, greater vibration damping, and greater fatigue life. Additionally, braided composite structures typically have better impact resistance compared to laminated composite structures made from plies of unidirectional or two-dimensional woven fabric materials. Braided structures tend to hold together and have greater residual strength and stiffness after an impact event, whereas laminated structures are susceptible to delamination failure. A braided overwrap provides a stronger connection between the stiffeners 80 and the cover skin 84 compared to a secondarily bonded or simple co-cured interface. Adhesively bonding both the cover skin 84 and the stiffeners 80 to the main body 76 results in the maximum possible bond area, and therefore results in a strong bonded connection. The bond between the stiffeners 80 and the ribs 83 also provides a shear connection between the cover 78 and the main body 76, which is much stronger than a conventionally bonded joint that relies solely on peel strength (i.e., through-thickness tension).

The preceding description is exemplary rather than limiting in nature. Variations and modifications to the disclosed examples may become apparent to those skilled in the art that do not necessarily depart from the essence of this disclosure. As shown, the composite cover 78, cover skin 84 and overwrap 86 each includes a single piece. In other examples, the composite cover 78, the cover skin 84 and overwrap 86 can each include a plurality of pieces. At least two of the pieces of the composite cover 78 can be spaced apart from each other on the same side of the airfoil. In other examples, the composite cover 78 includes a single piece, and the cover skin 84 and overwrap 86 each include a plurality of pieces. The pieces of the cover skin 84 and overwrap 86 can overlap or be placed edgewise to each of the other pieces of the cover skin 84 and overwrap 86. In further examples, at least one of the cover skin 84 and overwrap 86 can include two or more plies. Each of the plies can be constructed by any one of the examples previously given, and in some examples, at least one of the plies is constructed differently from another one of the plies. In other examples, at least one of the plies includes a different orientation of fibers than another one of the plies. The scope of legal protection given to this disclosure can only be determined by studying the following claims.

What is claimed is:

1. An airfoil comprising:
a main body extending between a leading edge and a trailing edge in a chordwise direction and extending between a tip and a root in a spanwise direction, said main body defining a suction side and a pressure side separated in a thickness direction and a plurality of channels extending inwardly from at least one of said suction and pressure sides; and
a composite cover attached to said main body, wherein said composite cover includes a plurality of stiffeners each received within one of said channels, a cover skin adjacent said stiffeners, and an over-wrap surrounding said stiffeners and said cover skin.

2. The airfoil of claim 1, wherein each of said stiffeners is formed from a stiffener wrap surrounding a stiffener body.

3. The airfoil of claim 2, wherein said stiffener body is removable from said stiffener wrap to define a stiffener shell.

4. The airfoil of claim 2, wherein said stiffener wrap includes a plurality of braided yarns.

5. The airfoil of claim 2, wherein said stiffener is made of a first material and said main body is made of a second material different from the first material in density.

6. The airfoil of claim 1, wherein said cover skin includes a braided fabric.

7. The airfoil of claim 6, wherein said braided fabric includes a first fiber material extending in a braid axial direction and a second fiber material different from said first fiber material and extending in a braid bias direction.

8. The airfoil of claim 1, wherein said composite cover is bonded to said channels.

9. The airfoil of claim 1, wherein said composite cover defines a continuous surface with at least one of said suction and pressure sides.

10. The airfoil of claim 1, wherein said composite cover includes a plurality of spacers each received between said over-wrap, one of said stiffeners and said cover skin.

11. The airfoil of claim 10, wherein each of said spacers includes at least one of a plurality of braided yarns and a braided fabric.

12. The airfoil of claim 11, wherein each of said spacers includes a foam material encapsulated by a spacer over-wrap.

13. A gas turbine engine comprising:
a turbine section; and
a fan section in communication said turbine section, said fan section including a plurality of fan blades, each fan blade including an airfoil and root, said airfoil including a main body and a composite cover attached to said main body;
wherein said main body defines a plurality of channels extending inwardly from at least one of a suction side and a pressure side defined by said main body; and
wherein said composite cover includes a cover skin, a plurality of stiffeners each received within one of said channels and an over-wrap surrounding said stiffeners and said cover skin.

14. The gas turbine engine of claim 13, wherein the fan section is driven by a geared architecture mechanically coupled to said turbine section.

15. The gas turbine engine of claim 13, wherein each of said stiffeners is formed from a stiffener wrap surrounding a stiffener body.

16. The gas turbine engine of claim 15, wherein said stiffener wrap includes a plurality of braided yarns.

17. The gas turbine engine of claim 13, wherein said cover skin includes at least one ply of a braided fabric.

18. A method of forming a composite cover for an airfoil, comprising:
forming a plurality of channels within at least one of a pressure side and a suction side of a main body;
fabricating a plurality of stiffeners each by braiding a plurality of fiber yarns over a stiffener body;
fabricating a cover skin from at least one ply of a braided fabric;
arranging each of said stiffeners adjacent to said cover skin;
surrounding said stiffeners and said cover skin with an over-wrap;
curing said stiffeners, said cover skin and said over-wrap within a resin to define a composite cover; and
bonding said composite cover to said channels.

19. The method as recited in claim 18, comprising the step of curing said fiber yarns within a resin to define a stiffener shell prior to the step of encapsulating said stiffeners and said cover skin with said over-wrap.

20. The method as recited in claim 18, wherein said composite cover defines a continuous surface with at least one of said suction and pressure sides.

* * * * *

UNITED STATES PATENT AND TRADEMARK OFFICE
CERTIFICATE OF CORRECTION

PATENT NO. : 9,957,972 B2  
APPLICATION NO. : 14/913709  
DATED : May 1, 2018  
INVENTOR(S) : Larry Foster Page 1 of 1

It is certified that error appears in the above-identified patent and that said Letters Patent is hereby corrected as shown below:

In the Claims

In Claim 13, Column 9, Line 19; replace "communication said" with --communication with said--

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*